United States Patent
Emori

(10) Patent No.: US 9,382,391 B2
(45) Date of Patent: Jul. 5, 2016

(54) CROSS-LINKABLE NITRILE RUBBER COMPOSITION AND METHOD OF PRODUCTION OF SAME

(75) Inventor: Nobuyoshi Emori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 930 days.

(21) Appl. No.: 13/502,689

(22) PCT Filed: Oct. 19, 2010

(86) PCT No.: PCT/JP2010/068307
§ 371 (c)(1),
(2), (4) Date: Apr. 18, 2012

(87) PCT Pub. No.: WO2011/049055
PCT Pub. Date: Apr. 28, 2011

(65) Prior Publication Data
US 2012/0214945 A1    Aug. 23, 2012

(30) Foreign Application Priority Data

Oct. 19, 2009    (JP) .................... 2009-240017

(51) Int. Cl.
*C08L 13/00*    (2006.01)
*C08L 9/02*    (2006.01)
*C08J 3/22*    (2006.01)
*C08K 5/18*    (2006.01)

(52) U.S. Cl.
CPC . *C08J 3/226* (2013.01); *C08K 5/18* (2013.01); *C08L 9/02* (2013.01); *C08L 13/00* (2013.01); *C08J 2409/00* (2013.01)

(58) Field of Classification Search
USPC ...................................... 525/329.3
See application file for complete search history.

(56) References Cited

U.S. PATENT DOCUMENTS

| | | |
|---|---|---|
| 6,657,014 B1 | 12/2003 | Mori et al. |
| 2006/0122336 A1 | 6/2006 | Belt et al. |
| 2010/0029857 A1 | 2/2010 | Soddemann et al. |
| 2010/0168302 A1 | 7/2010 | Nagamori et al. |
| 2011/0301300 A1 | 12/2011 | Iizuka |

FOREIGN PATENT DOCUMENTS

| | | |
|---|---|---|
| CN | 102300882 A | 12/2011 |
| EP | 1 674 519 A1 | 6/2006 |
| EP | 2 009 050 A1 | 12/2008 |
| JP | 2001-55471 A | 2/2001 |
| JP | 2005-533889 A | 11/2005 |
| JP | 2010-24452 A | 2/2010 |
| WO | 2005/037914 A1 | 4/2005 |
| WO | 2007/072900 A1 | 6/2007 |

OTHER PUBLICATIONS

Chinese Office Action, dated Mar. 12, 2013, for Chinese Application No. 201080047163.5.
International Search Report for PCT/JP2010/068307 dated Feb. 1, 2011.

*Primary Examiner* — Ling Choi
*Assistant Examiner* — Thuy-Al Nguyen
(74) *Attorney, Agent, or Firm* — Birch, Stewart, Kolasch & Birch, LLP

(57) ABSTRACT

A cross-linkable nitrile rubber composition obtained by mixing a master batch (B) which contains a nitrile copolymer rubber (b1) having an iodine value of 120 or less and an aromatic polyvalent amine cross-linking agent (b2) into a carboxyl group-containing nitrile copolymer rubber (A) having an iodine value of 120 or less and a cross-linked product obtained by cross-linking the same are provided.

10 Claims, No Drawings

CROSS-LINKABLE NITRILE RUBBER COMPOSITION AND METHOD OF PRODUCTION OF SAME

TECHNICAL FIELD

The present invention relates to a cross-linkable nitrile rubber composition and a method of production of the same, more particularly relates to a cross-linkable nitrile rubber composition which is able to give a cross-linked product which is excellent in mechanical strength and which can effectively suppress foaming at the time of steam cross-linking and a method of production of the same.

BACKGROUND ART

In the past, nitrile rubber has been used as a material for hoses, tubes, and other automobile use rubber parts by taking advantage of its oil resistance, mechanical properties, chemical resistance, etc. Further, nitrile rubber obtained by hydrogenating the carbon-carbon double bonds in the polymer main chain of the nitrile rubber is further excellent in heat resistance, so is used for hoses, seals, and other rubber parts.

In such nitrile rubber, to improve the compression set resistance, for example, Patent Document 1 discloses a cross-linkable rubber composition comprised of a nitrile rubber to which a polyamine cross-linking agent and basic cross-linking accelerator are added. However, in the cross-linkable rubber composition which is described in this Patent Document 1, when obtaining a cross-linked product, there was the problem that if performing steam cross-linking, foaming ended up occurring.

PRIOR ART DOCUMENTS

Patent Documents

Patent Document 1: Japanese Patent Publication (A) No. 2001-55471 (U.S. Pat. No. 6,657,014)

SUMMERY OF THE INVENTION

Problem to be Solved by the Invention

The present invention has as its object the provision of a cross-linkable nitrile rubber composition able to give a cross-linked product which is excellent in mechanical strength and which can effectively suppress foaming at the time of steam cross-linking and a method of production of the same. Further, the present invention has as its object the provision of a cross-linked product which is obtained using such a cross-linkable nitrile rubber composition.

Means for Solving the Problems

The inventors engaged in intensive research for achieving the above objects and as a result discovered that by mixing into a carboxyl group-containing nitrile copolymer rubber having an iodine value of 120 or less a master batch which contains a nitrile copolymer rubber having an iodine value of 120 or less and an aromatic polyvalent amine cross-linking agent, it is possible to achieve the above objects and thereby completed the present invention.

That is, according to the present invention, there is provided a method of producing a cross-linkable nitrile rubber composition comprising a step of preparing a carboxyl group-containing nitrile copolymer rubber (A) having an iodine value of 120 or less, a step of mixing with a nitrile copolymer rubber (b1) having an iodine value of 120 or less an aromatic polyvalent amine cross-linking agent (b2) to obtain a master batch (B), a step of mixing with the carboxyl group-containing nitrile copolymer rubber (A) the master batch (B).

Preferably, the step of obtaining a master batch (B) is a step of mixing the nitrile copolymer rubber (b1) and the aromatic polyvalent amine cross-linking agent (b2) at a temperature of a melting point of the aromatic polyvalent amine cross-linking agent (b2) or more.

Preferably, the carboxyl group-containing nitrile copolymer rubber (A) contains α,β-ethylenically unsaturated nitrile monomer unit in 10 to 60 wt %, carboxyl group-containing monomer unit in 0.1 to 20 wt %, and conjugated diene monomer unit and saturated conjugated diene monomer unit in a total of 20 to 89.9 wt %.

Preferably, the carboxyl group-containing monomer unit is mono-n-butyl maleate unit.

Preferably, the nitrile copolymer rubber (b1) contains α,β-ethylenically unsaturated nitrile monomer unit in 10 to 60 wt. % and conjugated diene monomer unit and saturated conjugated diene monomer unit in a total of 40 to 90 wt %.

Preferably, the content of the master batch (B) is 0.1 to 40 parts by weight with respect to the carboxyl group-containing nitrile copolymer rubber (A) as 100 parts by weight.

Preferably, a mixing ratio of the nitrile copolymer rubber (b1) and the aromatic polyvalent amine cross-linking agent (b2) is, by weight ratio, nitrile copolymer rubber (b1):aromatic polyvalent amine cross-linking agent (b2)=20:80 to 90:10.

Preferably, the aromatic polyvalent amine cross-linking agent (b2) is 2,2-bis[4-(4-aminophenoxy)phenyl]propane.

Further, according to the present invention, there is provided a cross-linkable nitrile rubber composition which is obtained by any of the above methods.

Furthermore, according to the present invention, there is provided a cross-linked product obtained by cross-linking the above cross-linkable nitrile rubber composition. The cross-linked product of the present invention preferably is obtained by cross-linking the cross-linkable nitrile rubber composition by treatment including steam cross-linking.

Effects of the Invention

According to the present invention, it is possible to provide a cross-linkable nitrile rubber composition which can give a cross-linked product which is excellent in mechanical strength and can effectively suppress foaming at the time of steam cross-linking and a method of production of the same. Further, according to the present invention, it is possible to provide a cross-linked product which is obtained by cross-linking such a cross-linkable nitrile rubber composition and which is excellent in mechanical strength and, further, a cross-linked product which is obtained by cross-linking including steam cross-linking such a cross-linkable nitrile rubber composition, which is excellent in mechanical strength, and which is effectively suppressed in foaming.

DESCRIPTION OF EMBODIMENTS

Cross-Linkable Nitrile Rubber Composition

The cross-linkable nitrile rubber composition of the present invention is a composition obtained by mixing a master batch (B) which contains a nitrile copolymer rubber (b1) having an iodine value of 120 or less and an aromatic polyvalent amine cross-linking agent (b2) into a carboxyl group-containing nitrile copolymer rubber (A) having an iodine value of 120 or less.

Carboxyl Group-Containing Nitrile Copolymer Rubber (A)

The carboxyl group-containing nitrile copolymer rubber (A) having an iodine value of 120 or less (below, abbreviated as a "carboxyl group-containing nitrile copolymer rubber (A)") used in the present invention is a rubber having an iodine value of 120 or less which is obtained through a step of copolymerization of an $\alpha,\beta$-ethylenically unsaturated nitrile monomer, a carboxyl group-containing monomer, and a monomer which can be copolymerized with these monomers which is added in accordance with need.

The $\alpha,\beta$-ethylenically unsaturated nitrile monomer is not particularly limited so long as being an $\alpha,\beta$-ethylenically unsaturated compound which has a nitrile group. For example, acrylonitrile; $\alpha$-chloroacrylonitrile, $\alpha$-bromoacrylonitrile, and other $\alpha$-halogenoacrylonitriles; methacrylonitrile and other $\alpha$-alkylacrylonitriles, etc. may be mentioned. Among these, acrylonitrile and methacrylonitrile are preferable, while acrylonitrile is particularly preferable. The $\alpha,\beta$-ethylenically unsaturated nitrile monomers may be used alone or in combinations of several types.

The content of the $\alpha,\beta$-ethylenically unsaturated nitrile monomer units is, with respect to the total monomer units, preferably 10 to 60 wt %, more preferably 15 to 55 wt %, furthermore preferably 20 to 50 wt %. If the content of the $\alpha,\beta$-ethylenically unsaturated nitrile monomer units is too small, the obtained cross-linked product is liable to fall in oil resistance, while conversely if too large, the cold resistance may fall.

The carboxyl group-containing monomer is not particularly limited so long as a monomer which can copolymerize with an $\alpha,\beta$-ethylenically unsaturated nitrile monomer and has at least one non-esterified unsubstituted (free) carboxyl group. As such a carboxyl group-containing monomer, for example, an $\alpha,\beta$-ethylenically unsaturated monocarboxylic acid monomer, $\alpha,\beta$-ethylenically unsaturated polyvalent carboxylic acid monomer, $\alpha,\beta$-ethylenically unsaturated dicarboxylic acid monoester monomer, etc. may be mentioned. Further, the carboxyl group-containing monomer may also include a monomer where the carboxyl groups of the monomer form a carboxylic acid salt. Furthermore, an anhydride of an $\alpha,\beta$-ethylenically unsaturated polyvalent carboxylic acid also is able to form a carboxyl group by opening the acid anhydride group after copolymerization, so can be used as a carboxyl group-containing monomer.

As an $\alpha,\beta$-ethylenically unsaturated monocarboxylic acid monomer, acrylic acid, methacrylic acid, ethyl acrylic acid, crotonic acid, cinnamic acid, etc. may be mentioned.

As an $\alpha,\beta$-ethylenically unsaturated polyvalent carboxylic acid monomer, fumaric acid, maleic acid, and other butenedioic acids, itaconic acid, citraconic acid, etc. may be mentioned. Further, as anhydrides of $\alpha,\beta$-ethylenically unsaturated polyvalent carboxylic acids, anhydrous maleic acid etc. may be mentioned.

As an $\alpha,\beta$-ethylenically unsaturated dicarboxylic acid monoester monomer, monomethyl maleate, monoethyl maleate, monopropyl maleate, mono-n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkylcycloalkyl esters; monomethyl fumarate, monoethyl fumarate, monopropyl fumarate, mono-n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkylcycloalkyl esters; monomethyl citraconate, monoethyl citraconate, monopropyl citraconate, mono-n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkylcycloalkyl esters; monomethyl itaconate, monoethyl itaconate, monopropyl itaconate, mono-n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkylcycloalkyl esters; etc. may be mentioned.

Among these, from the viewpoint that the effect of the present invention becomes more remarkable, an $\alpha,\beta$-ethylenically unsaturated dicarboxylic acid monoester monomer is preferable, an $\alpha,\beta$-ethylenically unsaturated dicarboxylic acid monoalkyl ester monomer which has an alkyl group with 2 to 4 carbon atoms is more preferable, mono-n-butyl fumarate, mono-n-butyl itaconate, and mono-n-butyl maleate are furthermore preferable, and mono-n-butyl maleate is particularly preferable.

The content of the carboxyl group-containing monomer units, with respect to the total monomer units, is preferably 0.1 to 20 wt %, more preferably 0.2 to 15 wt %, furthermore preferably 0.5 to 10 wt %. If the content of the carboxyl group-containing monomer units is too small, the obtained cross-linked product is liable to deteriorate in mechanical strength and compression set resistance, while conversely if too large, the cross-linkable nitrile rubber composition is liable to deteriorate in scorch stability and the obtained cross-linked product is liable to fall in fatigue resistance.

The carboxyl group-containing nitrile copolymer rubber (A) used in the present invention is preferably a copolymer obtained by copolymerizing a conjugated diene monomer with an $\alpha,\beta$-ethylenically unsaturated nitrile monomer and carboxyl group-containing monomer, from the viewpoint of the obtained cross-linked product expressing rubber elasticity.

The ratios of the monomers which are copolymerized, when defining the total amount of monomers which are provided for copolymerization as 100 parts by weight, are an $\alpha,\beta$-ethylenically unsaturated nitrile monomer of preferably 10 to 60 parts by weight, more preferably 15 to 55 parts by weight, particularly preferably 20 to 50 parts by weight, a carboxyl group-containing monomer of preferably 0.1 to 20 parts by weight, more preferably 0.2 to 15 parts by weight, particularly preferably 0.5 to 10 parts by weight, and a conjugated diene monomer of preferably 20 to 89.9 parts by weight, more preferably 30 to 84.8 parts by weight, particularly preferably 40 to 79.5 parts by weight.

Note that the conjugated diene monomer is not particularly limited so long as able to copolymerize with an $\alpha,\beta$-ethylenically unsaturated nitrile monomer and carboxyl group-containing monomer. 1,3-butadiene, isoprene, 2,3-dimethyl-1,3-butadiene, 1,3-pentadiene, and other conjugated diene monomers containing 4 to 6 carbon atoms are preferable, 1,3-butadiene and isoprene are more preferable, and 1,3-butadiene is particularly preferable. The conjugated diene monomers may be used alone or in combinations of several types.

The content of the conjugated diene monomer units is, with respect to the total monomer units, preferably 20 to 89.9 wt %, more preferably 30 to 84.8 wt %, furthermore preferably 40 to 79.5 wt %. If the content of the conjugated diene monomer units is too small, the rubber elasticity of the obtained cross-linked products is liable to fall, while conversely if too great, the heat resistance and chemical resistant stability may become impaired. Note that, the content of the above conjugated diene monomer units, when hydrogenating the copolymers as later explained, is the content including also the hydrogenated parts (saturated conjugated diene monomer units).

Further, the carboxyl group-containing nitrile copolymer rubber (A) used in the present invention may be a copolymer of an α,β-ethylenically unsaturated nitrile monomer, carboxyl group-containing monomer, and conjugated diene monomer with other monomer (I) which can copolymerize with the same. As such other monomer (I), ethylene, α-olefin monomer, aromatic vinyl monomer, α,β-ethylenically unsaturated carboxylic acid ester monomer (excluding ones corresponding to above-mentioned "carboxyl group-containing monomer"), fluorine-containing vinyl monomer, copolymerizable antiaging agent, etc. may be illustrated.

As the α-olefin monomer, a monomer containing 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinyl pyridine, etc. may be mentioned.

As the α,β-ethylenically unsaturated carboxylic acid ester monomers, for example, methyl acrylate, ethyl acrylate, n-butyl acrylate, n-dodecyl acrylate, methyl methacrylate, ethyl methacrylate, and other (meth)acrylic acid alkyl esters (abbreviation for methacrylic acid esters and acrylic acid esters", same below) which have alkyl groups with 1 to 18 carbon atoms; methoxymethyl acrylate, methoxyethyl acrylate, methoxyethyl methacrylate, and other (meth)acrylic acid esters which have alkoxyalkyl groups with 2 to 12 carbon atoms; α-cyanoethyl acrylate, α-cyanoethyl methacrylate, α-cyanobutyl methacrylate, and other (meth)acrylic acid esters which have a cyanoalkyl groups with 2 to 12 carbon atoms; 2-hydroxyethyl acrylate, 2-hydroxypropyl acrylate, 2-hydroxyethyl methacrylate, and other (meth)acrylic acid esters which have hydroxyalkyl groups with 1 to 12 carbon atoms; trifluoroethyl acrylate, tetrafluoropropyl methacrylate, and other (meth)acrylic acid ester which have fluoroalkyl groups with 1 to 12 carbon atoms; dimethyl maleate, dimethyl fumarate, dimethyl itaconate, diethyl itaconate, and other α,β-ethylenically unsaturated dicarboxylic acid dialkyl esters; dimethylaminomethyl acrylate, diethylaminoethyl acrylate, and other dialkylamino group-containing α,β-ethylenically unsaturated carboxylic acid ester; etc. may be mentioned.

As the fluorine-containing vinyl monomer, for example, fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy) aniline, N-phenyl-4-(4-vinylbenzyloxy)aniline, etc. may be mentioned.

These other copolymerizable monomers (I) can also be used in combinations of several types. The content of the units of the other monomers is, with respect to the total monomer units, preferably 50 wt % or less, more preferably 30 wt % or less, furthermore preferably 10 wt % or less.

The iodine value of the carboxyl group-containing nitrile copolymer rubber (A) is 120 or less, preferably 80 or less, more preferably 25 or less, particularly preferably 15 or less. If the iodine value of the carboxyl group-containing nitrile copolymer rubber (A) is too high, the obtained cross-linked product is liable to fall in heat resistance and ozone resistance.

The polymer Mooney viscosity ($ML_{1+4}$, 100° C.) of the carboxyl group-containing nitrile copolymer rubber (A) is preferably 15 to 200, more preferably 20 to 150, particularly preferably 30 to 120. If the polymer Mooney viscosity of the carboxyl group-containing nitrile copolymer rubber (A) is too low, the obtained cross-linked product is liable to fall in mechanical strength, while conversely if too high, the workability of the cross-linkable nitrile rubber composition may fall.

Further, the content of the carboxyl groups in the carboxyl group-containing nitrile copolymer rubber (A), that is, the number of moles of the carboxyl groups per 100 g of the carboxyl group-containing nitrile copolymer rubber (A), is preferably $5\times10^{-4}$ to $5\times10^{-1}$ ephr, more preferably $1\times10^{-3}$ to $1\times10^{-1}$ ephr, furthermore preferably $5\times10^{-3}$ to $6\times10^{-2}$ ephr. If the carboxyl group content of the carboxyl group-containing nitrile copolymer rubber (A) is too small, the obtained cross-linked product is liable to fall in mechanical strength, while if too large, the cross-linked product may fall in cold resistance.

The method of production of the carboxyl group-containing nitrile copolymer rubber (A) used in the present invention is not particularly limited. For example, a method of copolymerization of an α,β-ethylenically unsaturated nitrile monomer, a carboxyl group-containing monomer, a conjugated diene monomer, and other monomer (I) which can copolymerize with these which is added in accordance with need is preferable. As the polymerization method, any of the known emulsion polymerization method, suspension polymerization method, bulk polymerization method, and solution polymerization method may be used, but from the ease of control of the polymerization reaction, the emulsion polymerization method is preferred. Note that, if the iodine value of the copolymer which is obtained by copolymerization is higher than 120, the copolymer may be hydrogenated (hydrogenation reaction). The method of hydrogenation in this case is not particularly limited. Any known method may be employed.

Master Batch (B)

The master batch (B) used in the present invention is obtained by mixing an aromatic polyvalent amine cross-linking agent (b2) into the nitrile copolymer rubber (b1) having an iodine value of 120 or less.

The nitrile copolymer rubber (b1) having an iodine value of 120 or less (hereinafter referred to as a "nitrile copolymer rubber (b1)") is rubber having an iodine value of 120 or less which is obtained by copolymerization of an α,β-ethylenically unsaturated nitrile monomer and other monomer which can be copolymerized with it which is added in accordance with need. The nitrile copolymer rubber (b1) acts as a binder of the master batch (B). By use of the nitrile copolymer rubber (b1) to make the aromatic polyvalent amine cross-linking agent (b2) disperse in the master batch (B), the dispersibility of the aromatic polyvalent amine cross-linking agent (b2) in the carboxyl group-containing nitrile copolymer rubber (A) is improved.

As the α,β-ethylenically unsaturated nitrile monomer which is used for production of the nitrile copolymer rubber (b1), one similar to the above carboxyl group-containing nitrile copolymer rubber (A) may be used. Further, the content of the α,β-ethylenically unsaturated nitrile monomer units is, with respect to the total monomer units forming the nitrile copolymer rubber (b1), preferably 10 to 60 wt %, more preferably 15 to 55 wt %, furthermore preferably 20 to 50 wt %. If the content of the α,β-ethylenically unsaturated nitrile monomer units is too low, the obtained cross-linked product is liable to fall in oil resistance, while conversely if too great, the cold resistance may fall.

The nitrile copolymer rubber (b1) used in the present invention is preferably a copolymer which is obtained by copolymerizing an α,β-ethylenically unsaturated nitrile monomer and a conjugated diene monomer from the ease of the obtained cross-linked product exhibiting a rubber elasticity. As the conjugated diene monomer, one similar to the above-mentioned carboxyl group-containing nitrile copolymer rubber (A) may be used. Further, the content of the conjugated diene monomer units is, with respect to the total monomer units of the nitrile copolymer rubber (b1), preferably 40 to 90 wt %, more preferably 45 to 85 wt %, furthermore preferably 50 to 80 wt %. If the content of the conjugated diene monomer units is too small, the obtained cross-linked product is liable to fall in rubber elasticity, while conversely if too great, the heat resistance and the chemical resistant stability may be impaired. Note that, the content of the above conjugated diene monomer units, when hydrogenating the copolymers as later explained, is the content including also the hydrogenated parts (saturated conjugated diene monomer units).

Further, the nitrile copolymer rubber (b1) used in the present invention may also be a copolymer which is obtained by copolymerizing an α,β-ethylenically unsaturated nitrile monomer and conjugated diene monomer with other monomer (II) which can copolymerize with the same. As such other monomer (II), one similar to the above-mentioned "other monomer (I)" may be mentioned, but one which does not react with the aromatic polyvalent amine cross-linking agent (b2) is preferable. That is, the nitrile copolymer rubber (b1) preferably is one which does not react with the aromatic polyvalent amine cross-linking agent (b2). In particular, from the viewpoint of the actions and effects of the present invention becoming higher, the nitrile copolymer rubber (b1) is preferably one which does not contain a functional group which reacts with the aromatic polyvalent amine cross-linking agent (b2), that is, a carboxyl group. Note that, in this case, the nitrile copolymer rubber (b1) does not necessarily have to contain any carboxyl groups at all. It should be controlled to an amount where the carboxyl groups are not substantially contained at all (specifically, a number of moles of carboxyl groups per 100 g of the nitrile copolymer rubber (b1) of $5 \times 10^{-5}$ ephr or less).

The content of the units of the other monomer (II) is, with respect to the total monomer units of the nitrile copolymer rubber (b1), preferably 50 wt %, or less, more preferably 30 wt % or less, furthermore preferably 10 wt % or less, particularly preferably 0 wt %.

The iodine value of the nitrile copolymer rubber (b1) used in the present invention is 120 or less, preferably 80 or less, more preferably 25 or less, particularly preferably 15 or less. If the iodine value of the nitrile copolymer rubber (b1) is too high, the obtained cross-linked product is liable to fall in heat resistance and ozone resistance.

The polymer Mooney viscosity ($ML_{1+4}$, 100° C.) of the nitrile copolymer rubber (b1) used in the present invention is preferably 10 to 200, more preferably 20 to 150, particularly preferably 30 to 120. If the polymer Mooney viscosity of the nitrile copolymer rubber (b1) is too low, the obtained cross-linked product is liable to fall in mechanical strength, while conversely if too high, the cross-linkable nitrile rubber composition may fall in processability.

The method of production of a nitrile copolymer rubber (b1) used in the present invention is not particularly limited. For example, the method of copolymerizing an α,β-ethylenically unsaturated nitrile monomer, conjugated diene monomer, and other monomer (II) which can copolymerize with these which is added as needed is preferable. As the polymerization method, any of the known emulsion polymerization method, suspension polymerization method, bulk polymerization method, and solution polymerization method may be used, but from the ease of control of the polymerization reaction, the emulsion polymerization method is preferred. Note that, if the iodine value of the copolymer which is obtained by copolymerization is higher than 120, the copolymer may be hydrogenated (hydrogenation reaction). The method of hydrogenation in this case is not particularly limited. Any known method may be employed.

The aromatic polyvalent amine cross-linking agent (b2) used in the present invention is a polyvalent amine cross-linking agent which has one or more aromatic rings in the molecule. The aromatic polyvalent amine cross-linking agent (b2) is not particularly limited so long as (1) a compound which has one or more aromatic rings and two or more amino groups in its molecule or (2) a compound of the form of the compound, at the time of cross-linking, which has one or more aromatic rings and two or more amino groups in its molecule, but a compound where a plurality of hydrogen atoms of the aromatic hydrocarbon are substituted by amino groups or hydrazide structures (structures represented by —CONHNH$_2$, where CO indicates a carbonyl group) is preferable.

As the aromatic polyvalent amine cross-linking agent (b2), 4,4'-methylene dianiline, p-phenylene diamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2-bis[4-(4-aminophenoxy)phenyl]propane, 4,4'-diaminobenzanilide, 4,4'-bis(4-aminophenoxy)biphenyl, 1,3,5-benzene triamine, 4,4'-methylene bis(o-chloroaniline), or other aromatic polyvalent amines may be mentioned. Among these, the effects of the present invention become much more remarkable, so one with two to five amino groups in the molecule is preferable, one with two to three is more preferable, and one with two is particularly preferable. Further, one with one to eight aromatic rings in a molecule is preferable, one with two to seven is more preferable, and one with three to six is particularly preferable. Further, one which has a phenoxy group in a molecule is preferable, one which has one to four phenoxy groups in a molecule is more preferable, and 2,2-bis[4-(4-aminophenoxy)phenyl]propane is particularly preferable. Note that, the aromatic polyvalent amine cross-linking agent (b2) may be used alone or may be used in combinations of two or more types.

In the present invention, by mixing the aromatic polyvalent amine cross-linking agent (b2) in the nitrile copolymer rubber (b1) to obtain the master batch (B) and mixing this in the carboxyl group-containing nitrile copolymer rubber (A), it is possible to improve the dispersibility of the aromatic polyvalent amine cross-linking agent (b2) in the carboxyl group-containing nitrile copolymer rubber (A), possible to make the cross-linked product which is obtained by this one excellent in mechanical strength, and possible to effectively suppress foaming at the time of performing steam cross-linking.

The ratio of the nitrile copolymer rubber (b1) and the aromatic polyvalent amine cross-linking agent (b2) in the master batch (B) used in the present invention is, by weight ratio of the "nitrile copolymer rubber (b1):aromatic polyvalent amine cross-linking agent (b2)", preferably 20:80 to 90:10, more preferably 30:70 to 80:20, furthermore preferably 30:70 to 70:30. If the content of the nitrile copolymer rubber (b1) is too great, the cross-linking reactivity of the cross-linkable nitrile rubber composition is liable to fall. On the other hand, if the content of the nitrile copolymer rubber (b1) is too small, the dispersibility of the master batch (B) in the carboxyl group-containing nitrile copolymer rubber (A), that is, the dispersibility of the aromatic polyvalent amine cross-linking agent (b2), ends up falling, the obtained cross-linked product is liable to fall in mechanical strength, and foaming is liable to occur when performing steam cross-linking.

The content of the master batch (B) in the cross-linkable nitrile rubber composition of the present invention is, with respect to 100 parts by weight of the carboxyl group-containing nitrile copolymer rubber (A), preferably 0.1 to 40 parts by weight, more preferably 0.2 to 30 parts by weight, and furthermore preferably 1 to 15 parts by weight. If the content of the master batch (B) is too small, the cross-linking becomes insufficient and the obtained cross-linked product is liable to fall in mechanical properties and compression set resistance. If too great, the rubber cross-linked product may fall in fatigue resistance.

Further, the content of the aromatic polyvalent amine cross-linking agent (b2) in the cross-linkable nitrile rubber composition of the present invention is, with respect to 100 parts by weight of the carboxyl group-containing nitrile copolymer rubber (A), preferably 0.01 to 30 parts by weight, more preferably 0.1 to 15 parts by weight, furthermore preferably 0.5 to 10 parts by weight. If the content of the aromatic polyvalent amine cross-linking agent (b2) is too small, the cross-linking becomes insufficient and the obtained cross-linked product is liable to fall in mechanical properties and compression set resistance. On the other hand, if too great, the rubber cross-linked product may fall in fatigue resistance.

The master batch (B) used in the present invention is prepared by mixing the nitrile copolymer rubber (b1) and the aromatic polyvalent amine cross-linking agent (b2). Note that, when mixing these, the temperature of the mixing system is preferably made the temperature of the melting point of the aromatic polyvalent amine cross-linking agent (b2) or more to mix the nitrile copolymer rubber (b1) and the aromatic polyvalent amine cross-linking agent (b2). By mixing at the temperature of the melting point of the aromatic polyvalent amine cross-linking agent (b2) or more, the aromatic polyvalent amine cross-linking agent (b2) melts. Due to this, the nitrile copolymer rubber (b1) and the aromatic polyvalent amine-based cross-linking agent (b2) can be mixed more uniformly and the dispersibility of the aromatic polyvalent amine cross-linking agent (b2) in the carboxyl group-containing nitrile copolymer rubber (A) can be further improved. Note that, from the view point of the stability of the aromatic polyvalent amine cross-linking agent (b2), the mixing is preferably performed at 200° C. or less.

The cross-linkable nitrile rubber composition of the present invention may include, in addition to the carboxyl-group-containing nitrile copolymer rubber (A) and master batch (B), other compounding agents normally used in the rubber processing field. As the compound agents, for example, a reinforcing agent, filler, antioxidant, light stabilizer, scorch preventer, plasticizer, processing aid, slip agent, tackifier, lubrication agent, flame retardant, acid acceptor, antifungal agent, antistatic agent, coloring agent, silane coupling agent, co cross-liking agent, cross-linking aid, cross-linking retardant, foam agent, etc. may be mentioned. For the amounts of these compounding agents, amounts in accordance with the purpose of compounding can be suitably employed.

Further, the cross-linkable nitrile rubber composition of the present invention may contain a rubber other than the above carboxyl group-containing nitrile copolymer rubber (A) and nitrile copolymer rubber (b1) within a range not impairing the effects of the present invention.

As such a rubber, an acryl rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluororubber, natural rubber, polyisoprene rubber, etc. may be mentioned.

The amount in the cross-linkable nitrile rubber composition when mixing in a rubber other than a carboxyl group-containing nitrile copolymer rubber (A) and nitrile copolymer rubber (b1) is, with respect to a total 100 parts by weight of the carboxyl group-containing nitrile copolymer rubber (A) and nitrile copolymer rubber (b1), preferably 60 parts by weight or less, more preferably 30 parts by weight or less, furthermore preferably 10 parts by weight or less.

The cross-linkable nitrile rubber composition of the present invention is prepared by mixing the above ingredients in a preferably non-aqueous system. As the method of preferably preparing the cross-linkable nitrile rubber composition of the present invention, primarily mixing the ingredients other than the master batch (B) and unstable ingredients such as cross-linking aid which is unstable against heat etc. by a Bambury mixer, internal mixer, kneader, or other mixer, then transferring the mixture to an open roll etc., adding the master batch (B) and cross-linking aid which is unstable against heat etc. and performing secondary mixing may be mentioned. Note that, the primary mixing is usually performed at 10 to 200° C., preferably 30 to 180° C. in temperature for 1 minute to 1 hour, preferably 1 minute to 30 minutes and the secondary mixing is usually performed at 10 to 100° C., preferably 20 to 60° C. in temperature for 1 minute to 1 hour, preferably 1 minute to 30 minutes.

The compound Mooney viscosity ($ML_{1+4}$, 100° C.) of the cross-linkable nitrile rubber composition of the present invention is preferably 10 to 200, more preferably 20 to 180, particularly preferably 30 to 150. If the compound Mooney viscosity of the cross-linkable nitrile rubber composition is too low, the obtained cross-linked product is liable to fall in mechanical properties, while conversely if too high, the cross-linkable nitrile rubber composition may fall in processability.

Cross-Linked Product

The cross-linked product of the present invention is obtained by cross-linking the above-mentioned cross-linkable nitrile rubber composition of the present invention.

The cross-linked product of the present invention can be produced by using the cross-linkable nitrile rubber composition of the present invention, molding it, for example, by a molding machine suitable for the desired shape, for example, an extruder, injection molding machine, compressor, rolls, etc. and heating it to cause a cross-linking reaction and fix the shape as a cross-linked product. In this case, it is possible to mold the composition in advance, then cross-link it or to cross-link it simultaneously with molding it. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the cross-linked product, sometimes even if the surface is cross-linked, the inside is not sufficiently cross-linked, so the product may be further heated for secondary cross-linking.

As the cross-linking method, press cross-linking, steam cross-linking, oven cross-linking, or other general method which are used for cross-linking rubber may be suitably selected. The cross-linkable nitrile rubber composition of the present invention can suppress the form of the cross-linked product which may occur when performing steam cross-linking, so this may be suitably used for a cross-linking method which obtains a cross-linked product by cross-linking including steam cross-linking.

The thus obtained cross-linked product of the present invention is excellent in mechanical strength. Further, the cross-linked product is effectively suppressed from foaming when obtained by steam cross-linking.

For this reason, the cross-linked product of the present invention, making use of these characteristics, can be used for O-rings, packings, diaphragms, oil seals, shaft seals, bearing seals, wellhead seals, air compressor seals, seals for sealing the chlorofluorocabon or fluorohydrocarbons or carbon dioxide used for cooling apparatuses of air-conditioners or compressors for cooling machines for air-conditioning systems, seals for sealing supercritical carbon dioxide or subcritical carbon dioxide used for washing media for precision washing, seals for roller devices (roller bearings, automobile hub units, automobile water pumps, linear guide devices, ball and screws, etc.), valves and valve seats, BOP (blow out preventers), blatters, and other various sealing members; and intake manifold gaskets attached to connecting parts of intake manifolds and cylinder heads, cylinder head gaskets attached to connecting parts of cylinder blocks and cylinder heads, rocker cover gaskets attached to connecting parts of rocker covers and cylinder heads, oil pan gaskets attached to connecting parts of oil pans and cylinder blocks or transmission cases, gaskets for fuel cell separators attached between a pair of housings sandwiching a unit cell provided with anode, electrolyte plates, and cathodes, gaskets for top covers of hard disk drives, and other various types of gaskets; printing rolls, ironmaking rolls, papermaking rolls, industrial rolls, office equipment rolls, and other various types of rolls; flat belts (film core flat belts, cord flat belts, maltilayer flat belts, single piece flat belts, etc.), V-belts (wrapped V-belts, low edge V-belts, etc.), V-ribbed belts (single V-ribbed belts, double V-ribbed belts, wrapped V-ribbed belts, back surface rubber V-ribbed belts, top cog V-ribbed belts, etc.), CVT belts, timing belts, toothed belts, conveyor belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flowlines, and other various types of hoses; CVJ boots, propeller shaft boots, constant velocity joint boots, rack and pinion boots, and other various types of boots; cushion materials, dynamic dampers, rubber couplings, air springs, vibration proofing materials, and other damping material rubber parts; dust covers, car interior members, tires, covered cables, shoe soles, electromagnetic wave shields, binders for flexible printed circuit boards and other binders, fuel cell separators, and other broad applications in the electronics field, etc.

EXAMPLES

Below, examples and comparative examples will be given to specifically explain the present invention. Below, unless otherwise indicate, the "parts" are based on weight. Further, the tests and evaluation were performed as below.

Iodine Value

The iodine value of the nitrile rubber was measured in accordance with JIS K6235.

Carboxyl Group Content

Carboxyl group content was measured by adding to 2 mm square pieces of nitrile rubber in an amount of 0.2 g, ethanol 20 ml and water 10 ml and, while stirring, using potassium hydroxide in a 0.02N hydrous ethanol solution for titration at room temperature using thymol phthalein as an indicator so as to find the number of moles of carboxyl groups to nitrile rubber 100 g (unit: ephr).

Acrylonitrile Unit Content

Found by calculation of the content of nitrogen in nitrile rubber measured in accordance with JIS K6384 by the Kjeldahl method (unit: wt %).

Mooney Viscosity

The Mooney viscosity (polymer Mooney) of the nitrile rubber was measured in accordance with JIS K6300 (unit: [$ML_{1+4}$, 100° C.]).

Dispersibility of Cross-Linking Agent

The cross-linkable nitrile rubber composition after secondary mixing was used for visual examination of clumps of the cross-linking agent at the surface and inside (poor dispersibility) for evaluation. Note that, the dispersibility of the cross-linking agent was evaluated by the following criteria.

Good: Clumps of cross-linking agent could not be visually observed (good dispersibility)

Poor: Clumps of cross-linking agent could be visually observed (poor dispersibility)

Normal Physical Properties (Tensile Strength, Elongation, Hardness)

The cross-linkable nitrile rubber composition was placed in a vertical 15 cm, horizontal 15 cm, and depth 0.2 cm mold. This was pressed by a pressure of 10 MPa while pressing at 170° C. for 20 minutes for primary cross-linking. Next, the obtained primary cross-linked product was further heated in a gear type oven under conditions of 170° C. for 4 hours for secondary cross-linking to thereby obtain a sheet-shaped press cross-linked product. Further, separate from this, the cross-linkable nitrile rubber composition was shaped at 100° C. for 5 minutes under a pressure of 5 MPa to obtain a 2 mm thick sheet-shaped article. The obtained shaped article was used for steam cross-linking in a vulcanizing pan at 150° C. for 4 hours to thereby obtain a sheet-shaped steam cross-linked product. Further, the obtained press cross-linked product and steam cross-linked product were punched into No. 3 dumbbell shapes to prepare test pieces. Next, the test pieces were used to measure the tensile strength and elongation in accordance with JIS K6251 and to measure the hardness in accordance with JIS K6253 using a durometer hardness tester (type A).

Compression Set

The cross-linkable nitrile rubber composition was pressed using a mold at a temperature of 170° C. for 25 minutes for primary cross-linking to obtain a diameter 29 mm, height 12.7 mm cylindrical primary cross-linked product, then the obtained primary cross-linked product was heated in a gear type oven under conditions of 170° C. and 4 hours for secondary cross-linking to thereby obtain a press cross-linked product. Further, the obtained press cross-linked product was used and, in accordance with JIS K6262, the press cross-linked product was measured for compression set after being allowed to stand in a 150° C. environment for 168 hours in the state pressed by 25%.

The smaller the value, the better the compression set resistance.

Existence of Foaming of Steam Cross-Linked Product

The cross-linkable nitrile rubber composition was shaped using a mold at 100° C. for 5 minutes under a pressure of 5 MPa to obtain a 2 mm thick sheet-shaped article. The obtained shaped article was steam cross-linked in a vulcanizing pan at 150° C. for 4 hours to thereby obtain a vertical 15 cm, horizontal 8 cm sheet-shaped steam cross-linked product. Next, the surface was visually examined to thereby count the number of bubbles of foam at the steam cross-linked product.

Production Example 1

Production of Carboxyl Group-Containing Nitrile Copolymer Rubber (A-1)

To a metal bottle, ion exchanged water in 180 parts, concentration 10 wt % of sodium dodecyl benzene sulfonate aqueous solution in 25 parts, acrylonitrile in 37 parts, mono-n-butyl maleate in 6 parts, and t-dodecyl mercaptan (molecular weight adjuster) in 0.75 part were charged in that order. The inside air was replaced with nitrogen three times, then 1,3-butadiene in 57 parts was charged. The metal bottle was held at 5° C., cumen hydroperoxide (polymerization initiator) in 0.1 part was charged, then the metal bottle was rotated while performing a polymerization reaction for 16 hours. After that, a concentration 10 wt % of hydroquinone aqueous solution (polymerization anticatalyst) in 0.1 part was added to stop the polymerization reaction, then a water temperature 60° C. rotary evaporator was used to remove the residual monomers and thereby obtain a latex of acrylonitrile-butadiene-mono-n-butyl maleate copolymer rubber (solid concentration of about 30 wt %).

Next, a palladium catalyst (mixed solution of 1 wt % palladium acetate acetone solution and equal weight of ion exchanged water) was added to an autoclave to give a palladium content of 1000 ppm with respect to the weight of rubber which is contained in the latex and the mixture was subjected to a hydrogenation reaction at a hydrogen pressure of 3 MPa and a temperature of 50° C. for 6 hours to obtain a latex of the carboxyl group-containing nitrile copolymer rubber (A-1).

Further, to the obtained latex of the carboxyl group-containing nitrile copolymer rubber (A-1), two volumes of methanol were added for coagulation, then the coagulated rubber was dried at 60° C. for 12 hours in vacuo to thereby obtain the carboxyl group-containing nitrile copolymer rubber (A-1). The obtained carboxyl group-containing nitrile copolymer rubber (A-1) had an iodine value of 10, a carboxyl group content of $3.2 \times 10^{-2}$ ephr, and a polymer Mooney viscosity ($ML_{1+4}$, 100° C.) of 45.

Note that, the Kjeldahl method was used to find the acrylonitrile unit content, the mono-n-butyl maleate unit content was found from the carboxyl group content, and the balance was found by calculation as 1,3-butadiene units. The composition of the carboxyl group-containing nitrile copolymer rubber (A-1) found was acrylonitrile units 36 wt %, butadiene units (including hydrogenated) 58.5 wt %, and mono-n-butyl maleate units 5.5 wt %.

Example 1

In a capacity 55 ml Brabender type mixer, hydrogenated nitrile rubber (product name: Zetpol 2000L, made by Zeon Corporation, acrylonitrile unit content 36 wt %, butadiene units (including hydrogenated) 64 wt %, iodine value 4, Mooney viscosity 65, carboxyl group content $5 \times 10^{-6}$ ephr or less) 100 parts was kneaded for 1 minute. Next, 2,2-bis[4-(4-aminophenoxy)phenyl]propane (aromatic polyvalent amine cross-linking agent (b2)) 100 parts was added. The temperature was made a temperature of more than the melting point 128° C. of 2,2-bis[4-(4-aminophenoxy)phenyl]propane, that is, 130° C., to melt the 2,2-bis[4-(4-aminophenoxy)phenyl]propane. This was kneaded in that state for 5 minutes to prepare the master batch (B-1).

Next, a Bambury mixer was used to mix, with the carboxyl group-containing nitrile copolymer rubber (A-1) which was obtained at Production Example 1 in 100 parts, FEF carbon black (product name: Seast SO, made by Tokai Carbon) in 40 parts, trimellitic acid ester (product name: ADK Cizer C-8, made by Adeka, plasticizer) in 5 parts, 4,4'-di-(α,α'-dimethylbenzyl)diphenylamine (product name: Nauguard 445, made by Crompton, antiaging agent) in 1.5 parts, stearic acid (cross-linking accelerator) in 1 part, and polyoxyethylene alkyl ether phosphoric acid ester (product name: Phosphanol RL210, made by Toho Chemical, processing aid) in 1 part at 50° C. for 5 minutes. Next, the obtained mixture was transferred to a 50° C. roll where the above prepared master batch (B-1) in 6.77 parts and 1,3-di-o-tolylguanidine (product name: Noccelar DT, made by Ouchi Shinko Chemical Industrial, cross-linking aid) in 2 parts were mixed and kneaded to prepare a cross-linkable nitrile rubber composition.

Further, the above methods were used to evaluate the dispersibility of the cross-linking agent in the cross-linkable nitrile rubber composition, normal physical properties of the press cross-linked product, normal physical properties of the steam cross-linked product, existence of foaming, and compression set. The results are shown in Table 1.

Example 2

Except for changing the amount of the 2,2-bis[4-(4-aminophenoxy)phenyl]propane from 100 parts to 50 parts, the same procedure was followed as in Example 1 to prepare the master batch (B-2). Except for, instead of the master batch (B-1) in 6.77 parts, using the master batch (B-2) in 10.2 parts, the same procedure was followed as in Example 1 to prepare and evaluate the cross-linkable nitrile rubber composition. The results are shown in Table 1.

Comparative Example 1

Except for not using the master batch (B-1) 6.77 parts, but mixing in 2,2-bis[4-(4-aminophenoxy)phenyl]propane 3.39 parts without forming a master batch, the same procedure was followed as in Example 1 to prepare a cross-linkable nitrile rubber composition. The results are shown in Table 1.

Comparative Example 2

Except for not using the master batch (B-1) 6.77 parts, but mixing in hexamethylenediamine carbamate (product name: Diak#1, made by Dupont Dow Elastomer, melting point 154° C. aliphatic polyvalent amine cross-linking agent) 2.6 parts without forming a master batch, the same procedure was followed as in Example 1 to prepare a cross-linkable nitrile rubber composition. The results are shown in Table 1.

TABLE 1

|  |  | Examples | | Comp. Ex. | |
| --- | --- | --- | --- | --- | --- |
|  |  | 1 | 2 | 1 | 2 |
| Composition of cross-linkable nitrile rubber composition | | | | | |
| Carboxyl group-containing nitrile copolymer rubber (A-1) | (parts) | 100 | 100 | 100 | 100 |
| Master batch (B-1) | (parts) | 6.77 | — | — | — |
| Master batch (B-2) | (parts) | — | 10.2 | — | — |
| 2,2-bis[4-(4-aminophenoxy)phenyl]propane | (parts) | — | — | 3.39 | — |
| Diak #1 | (parts) | — | — | — | 2.6 |
| Noccelar DT | (parts) | 2 | 2 | 2 | 2 |
| FEF carbon black | (parts) | 40 | 40 | 40 | 40 |
| ADK Cizer C-8 | (parts) | 5 | 5 | 5 | 5 |
| Nauguard 445 | (parts) | 1.5 | 1.5 | 1.5 | 1.5 |
| Stearic acid | (parts) | 1 | 1 | 1 | 1 |
| Phosphanol RL210 | (parts) | 1 | 1 | 1 | 1 |
| Composition of master batch | | | | | |
| Zetpol 2000L | (parts) | 50 | 66.7 | — | — |
| 2,2-bis[4-(4-aminophenoxy)phenyl]propane | (parts) | 50 | 33.3 | — | — |
| Evaluation of cross-linkable nitrile rubber composition | | | | | |
| Dispersibility of cross-linking agent | | Good | Good | Poor | Good |
| Evaluation of press cross-linked product | | | | | |
| Tensile strength | (MPa) | 26.1 | 25.3 | 22.8 | 21.1 |
| Elongation | (%) | 360 | 380 | 310 | 230 |
| Hardness | (Duro-A) | 71 | 70 | 71 | 69 |
| Compression set | (%) | 15 | 15 | 15 | 14 |
| Evaluation of steam cross-linked product | | | | | |
| Tensile strength | (MPa) | 16.9 | 16.5 | 16.4 | — |
| Elongation | (%) | 320 | 340 | 300 | — |
| Hardness | (Duro-A) | 64 | 63 | 65 | — |
| Existence of Foam (visually countable number) | (No.) | 0 | 0 | 10 | 100 or more |

(Note)
2,2-bis[4-(4-aminophenoxy)phenyl]propane

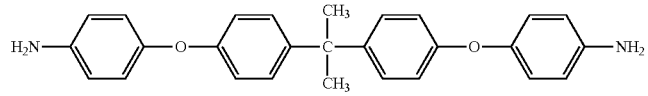

From Table 1, it can be confirmed that a cross-linkable nitrile rubber composition which is obtained by mixing a master batch (B) which contains a nitrile copolymer rubber (b1) having an iodine value of 120 or less and an aromatic polyvalent amine cross-linking agent (b2) into a carboxyl group-containing nitrile copolymer rubber (A) having an iodine value of 120 or less is excellent in dispersibility of the cross-linking agent and can give a press cross-linked product which is excellent in normal physical properties (tensile strength, elongation, hardness) and compression set resistance. Further, the steam cross-linked product which is obtained by steam cross-linking this composition was superior in normal physical properties (tensile strength, elongation, hardness) and was effectively suppressed in foaming (Examples 1 to 2).

As opposed to this, when not forming the aromatic polyvalent amine cross-linking agent (b2) into a master batch, but directly mixing it with a carboxyl group-containing nitrile copolymer rubber (A) having an iodine value of 120 or less, the dispersibility of the cross-linking agent becomes poor and the obtained press cross-linked product becomes inferior in tensile strength and elongation. Further, when steam cross-linking it, foaming is caused (Comparative Example 1).

Further, when using an aliphatic polyvalent amine carbonate as a cross-linking agent, the obtained press cross-linked product is inferior in tensile strength and elongation, while when steam cross-linking it, foaming remarkably occurs and it was not possible to obtain a steam cross-linked product which has the mechanical strength which is required for measuring the normal physical properties (Comparative Example 2).

The invention claimed is:

1. A method of producing a cross-linkable nitrile rubber composition comprising
   a step of preparing a carboxyl group-containing nitrile copolymer rubber (A) having an iodine value of 120 or less,
   a step of mixing with a nitrile copolymer rubber (b1) having an iodine value of 120 or less an aromatic polyvalent amine cross-linking agent (b2) to obtain a master batch (B),
   a step of mixing with said carboxyl group-containing nitrile copolymer rubber (A) said master batch (B),
   wherein a number of moles of carboxyl groups which the nitrile copolymer rubber (b1) contains per 100 g of the nitrile copolymer rubber (b1) is $5 \times 10^{-5}$ ephr or less.

2. The method of production of a cross-linkable nitrile rubber composition as set forth in claim 1, wherein said step of obtaining a master batch (B) is a step of mixing said nitrile copolymer rubber (b1) and said aromatic polyvalent amine cross-linking agent (b2) at a temperature of a melting point of said aromatic polyvalent amine cross-linking agent (b2) or more.

3. The method of production of a cross-linkable nitrile rubber composition as set forth in claim 1, wherein said carboxyl group-containing nitrile copolymer rubber (A) contains α,β-ethylenically unsaturated nitrile monomer unit in 10 to 60 wt %, carboxyl group-containing monomer unit in 0.1 to 20 wt %, and conjugated diene monomer unit and saturated conjugated diene monomer unit in a total of 20 to 89.9 wt %.

4. The method of production of a cross-linkable nitrile rubber composition as set forth in claim 1, wherein said carboxyl group-containing monomer unit is mono-n-butyl maleate unit.

5. The method of production of a cross-linkable nitrile rubber composition as set forth in claim 1, wherein said nitrile copolymer rubber (b1) contains α,β-ethylenically unsaturated nitrile monomer unit in 10 to 60 wt % and conjugated diene monomer unit and saturated conjugated diene monomer unit in a total of 40 to 90 wt %.

6. The method of production of a cross-linkable nitrile rubber composition as set forth in claim 1, wherein the content of the master batch (B) is 0.1 to 40 parts by weight with respect to said carboxyl group-containing nitrile copolymer rubber (A) as 100 parts by weight.

7. The method of production of a cross-linkable nitrile rubber composition as set forth in claim 1, wherein a mixing ratio of said nitrile copolymer rubber (b1) and said aromatic polyvalent amine cross-linking agent (b2) is, by weight ratio, nitrile copolymer rubber (b1):aromatic polyvalent amine cross-linking agent (b2)=20:80 to 90:10.

8. The method of production of a cross-linkable nitrile rubber composition as set forth in claim 1, wherein said aromatic polyvalent amine cross-linking agent (b2) is 2,2-bis [4-(4-aminophenoxy)phenyl]propane.

9. A method of producing a cross-linked product, comprising:
    a step of cross-linking the cross-linkable nitrile rubber composition obtained by the method of claim 1.

10. A method of producing a cross-linked product, comprising:
    a step of cross-linking the cross-linkable nitrile rubber composition obtained by the method of claim 1 by treatment including steam cross-linking.

* * * * *